(12) United States Patent
Ng

(10) Patent No.: US 8,181,517 B2
(45) Date of Patent: May 22, 2012

(54) SENDER CARD CONTAMINATION REDUCTION DUE TO CURRENT APPLICATION TO SENDER CARD

(75) Inventor: Raymond Ng, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 651 days.

(21) Appl. No.: 12/394,938

(22) Filed: Feb. 27, 2009

(65) Prior Publication Data

US 2010/0218602 A1    Sep. 2, 2010

(51) Int. Cl.
*G01F 23/36* (2006.01)
(52) U.S. Cl. .......................... 73/317; 73/313; 73/304 R
(58) Field of Classification Search ............... 73/304 R, 73/304 C, 317
See application file for complete search history.

(56) References Cited

U.S. PATENT DOCUMENTS

| | | | |
|---|---|---|---|
| 4,116,045 A * | 9/1978 | Potter | 73/61.46 |
| 4,271,446 A * | 6/1981 | Comstock | 361/56 |
| 5,520,547 A | 5/1996 | Hamaoka et al. | |
| 6,127,916 A | 10/2000 | Cooper et al. | |
| 6,828,898 B2 | 12/2004 | Dedert et al. | |
| 6,985,067 B2 | 1/2006 | Dedert et al. | |
| 6,985,068 B2 | 1/2006 | Dedert et al. | |
| 7,002,447 B2 | 2/2006 | Dedert et al. | |
| 2004/0196137 A1 | 10/2004 | Dedert et al. | |
| 2005/0035843 A1 | 2/2005 | Dedert et al. | |
| 2005/0040929 A1 | 2/2005 | Dedert et al. | |
| 2005/0040930 A1 | 2/2005 | Dedert et al. | |

\* cited by examiner

*Primary Examiner* — Hezron E Williams
*Assistant Examiner* — Paul West
(74) *Attorney, Agent, or Firm* — Young Basile Hanlon & MacFarlane, P.C.

(57) ABSTRACT

Disclosed herein is a system for use in a tank containing a contaminative fluid. The system includes an electrically conductive resistive material in fluid communication with the contents of the tank, a controller configured to periodically generate a control signal, and a variable power supply coupled to the electrically conductive material to provide a current within a normal operating range and to supply current at an elevated level in response to a control signal, wherein the elevated level is selected to heat the electrically conductive material to a temperature sufficient to remove contamination building thereon.

8 Claims, 5 Drawing Sheets

Contamination removal phase

SENDER CARD CONTAMINATION REDUCTION DUE TO CURRENT APPLICATION TO SENDER CARD

FIELD OF THE INVENTION

The present invention pertains to reducing contamination of a sender card.

BACKGROUND

The fuel level of an automobile is typically measured using a variable resistor mechanism mounted in a fuel tank. The variable resistor mechanism may include a sender card having a variable resistor and a float having a float arm. The float arm can be pivotally mounted to the sender card and can include a wiper for making a connection thereon. The position of the float arm varies as the float rises and falls with the fuel level, and accordingly, the rising and falling of the float can also cause a movement of the wiper. Depending on the position of the wiper on the variable resistor, the resistance value will differ, which can be translated into a voltage level representing the fuel level in the fuel tank. The voltage level can be transmitted to a fuel gauge on the instrument panel of an automobile to indicate the level of fuel remaining in the fuel tank.

Since the sender card is located within the fuel tank and is frequently immersed in fuel, contamination can form on electrical components located thereon. This contamination can be non-conductive and can generate inaccurate voltage level readings from the sender card.

Techniques for dealing with contamination presently available, for example, place contamination resistant coatings on the electrical components. These contamination resistant coatings can contain conductive metals that may not be chemically reactive with fuel such as gold, palladium, copper-nickel alloys and noble metals. However, use of these contamination resistant coatings may, for example, increase the cost of manufacturing the sender card. Additionally, for example, if contamination forms on electrical components on the sender card even though the electrical components contain a contamination resistant coating, there may not be a mechanism by which contamination can be removed after it has been formed.

SUMMARY

Embodiments of a system for use in a tank containing a contaminative fluid are taught herein. In one such embodiment, a system includes an electrically conductive resistive material in fluid communication with the contents of the tank. The system also includes a controller configured to periodically generate a control signal and a variable power supply. The variable power supply is coupled to the electrically conductive material to provide current within a normal operating range. In response to a control signal, the variable power supply also supplies current at an elevated level. The elevated current level is selected to heat the electrically conductive material to a temperature sufficient to remove contamination building thereon.

Embodiments of a sensor for measuring the level of a contaminative substance in a tank are also taught herein. In one such embodiment, a sensor includes a float mechanism and a sender card having a variable resistor and in fluid communication with the contaminative substance. The float mechanism is located inside the tank to move with changes in the level of the contaminative substance. The sensor also includes a wiper coupled to the float mechanism and a variable voltage supply. The wiper makes electrical contact with the variable resistor at a position determined by the position of the float mechanism. The variable voltage supply is coupled to one of the wiper and the sender card so that contact of the wiper with the variable resistor closes a circuit permitting current to flow from the variable voltage supply through the variable resistor. The variable voltage supply is configured to supply a steady-state operating voltage within a first range and periodic voltage at a surge level above the first range. The surge level is selected to provide enough additional power to heat the variable resistor to an elevated temperature sufficient to remove at least a portion of the contamination accumulating on the sender card.

Embodiments of a method for removing contamination on electrically conductive resistive material in fluid communication with the contents of a tank are also taught herein. In one such embodiment, a method includes supplying an operating current to the material during a contamination accumulation phase. The method also includes supplying an elevated current to the material during a periodic contamination removal phase. The elevated current is sufficiently high to cause the temperature of the material to rise at least by a predetermined amount above the temperature of the material during the contamination accumulation phase.

Other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
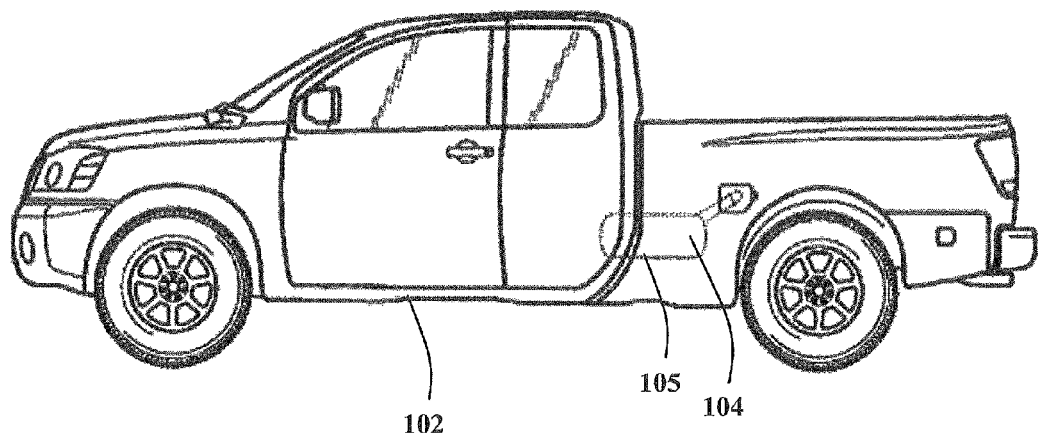
FIG. 1 is a perspective view of a vehicle equipped with a sensor for measuring the level of a substance according to one embodiment of the present invention.
Figure 2:
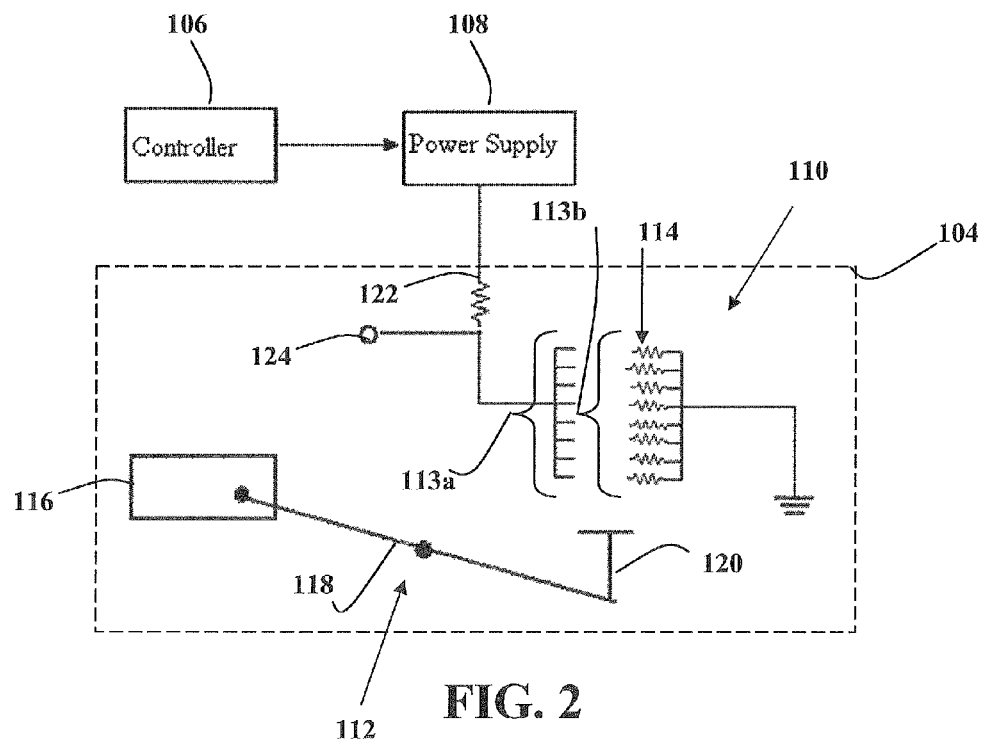
FIG. 2 is a block diagram of a controller, a power supply and the sensor in shown in FIG. 1.
Figure 3:
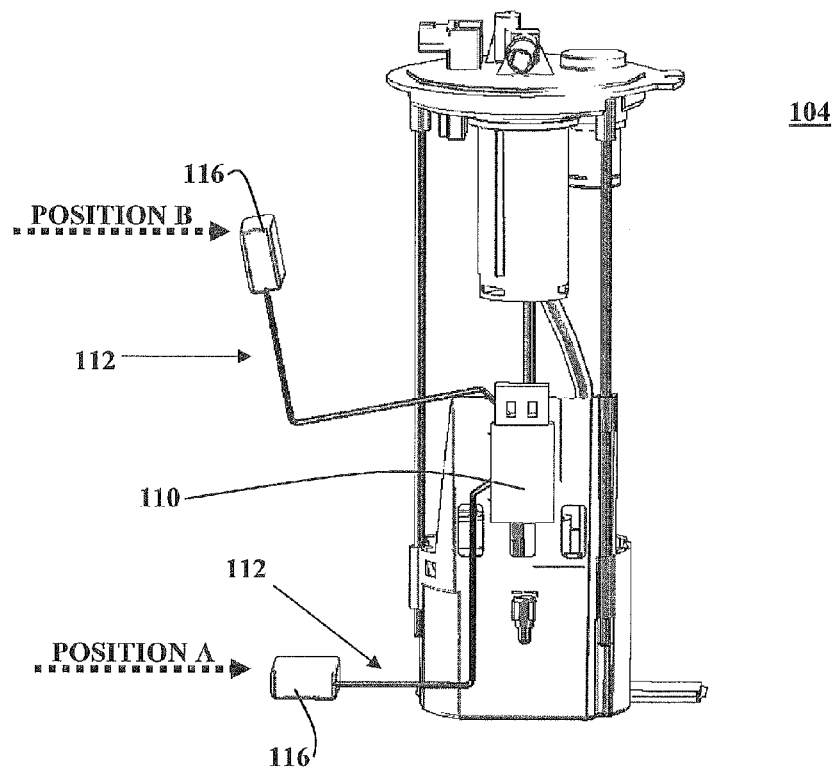
FIG. 3 is a perspective view of the sensor shown in FIG. 1.

As shown in a FIGS. 1-3, a sender card contamination reduction system 100 in a vehicle 102 can include a sensor 104 for measuring the level of a fluid (not shown) in a tank 105, a controller 106 and a power supply 108. Controller 106 can be connected to power supply 108, and in turn, power supply 108 can be coupled to the sensor 104. The sensor 104 can be in fluid communication with the contents (i.e. fluid) in tank 105 and can include a sender card 110 and a mechanical sensor 112. As discussed in more detail below, system 100 can be configured to substantially reduce or remove contamination on at least a portion of sender card 110.

Contamination can include, but is not limited to, the introduction of any impurity to sender card 110 or any component attached directly or indirectly to sender card 110. Other types of contamination are also possible. Impurities can include, for example, any physical, chemical, biological, or radiological substance introduced to the sender card or its components through the sender card's environment. Other types of impurities are also possible. Contamination can also include corrosion of sender card 110 or any component attached directly or indirectly to sender card 110. Corrosion of the sender card can include, for example, the chemical or electrochemical reaction between the sender card and its environment that can produce a deterioration of at least a portion of any part of the sender card. Other types of corrosion are also possible. The environment causing the contamination can include any solid, liquid or gas in direct or indirect contact with the sender card or any component attached directly or indirectly to the sender card.

Generally, vehicle 102 can be any type of vehicle containing a tank, such as a sedan, SUV or bus. Although embodiments of the present invention are described with reference to the vehicle configuration illustrated in FIG. 1, embodiments of the present invention are not limited to any vehicle type, configuration, make or model. Tank 105 can be of any size or shape suitable for use in vehicle 102. Tank 105 can be a fuel tank adapted to supply fluid, such as fuel, to an engine of a vehicle. The fluid can be any fluid that can cause contamination of sender card 110. Some non-limiting examples of fluids that can cause contamination can be fossil fuel, an alcohol, biofuel, water, acid, natural gas or the like. Alternatively, contamination formation is not limited to being caused by liquids and can be caused by any other contaminative fluid or substance including any solid, liquid, gas or any chemical reaction therebetween. As one non-limiting example, contamination on sender card 110 can be caused by hydrogen or oxygen.

Further, although sensor 104 is shown located on the rear of vehicle 102, sensor 104 may be located in any other part of vehicle 102 dependent upon the location of tank 105. Further, controller 106 and power supply 108 can be located in any part of the vehicle independent or dependent of where the tank is located.

Figure 4:
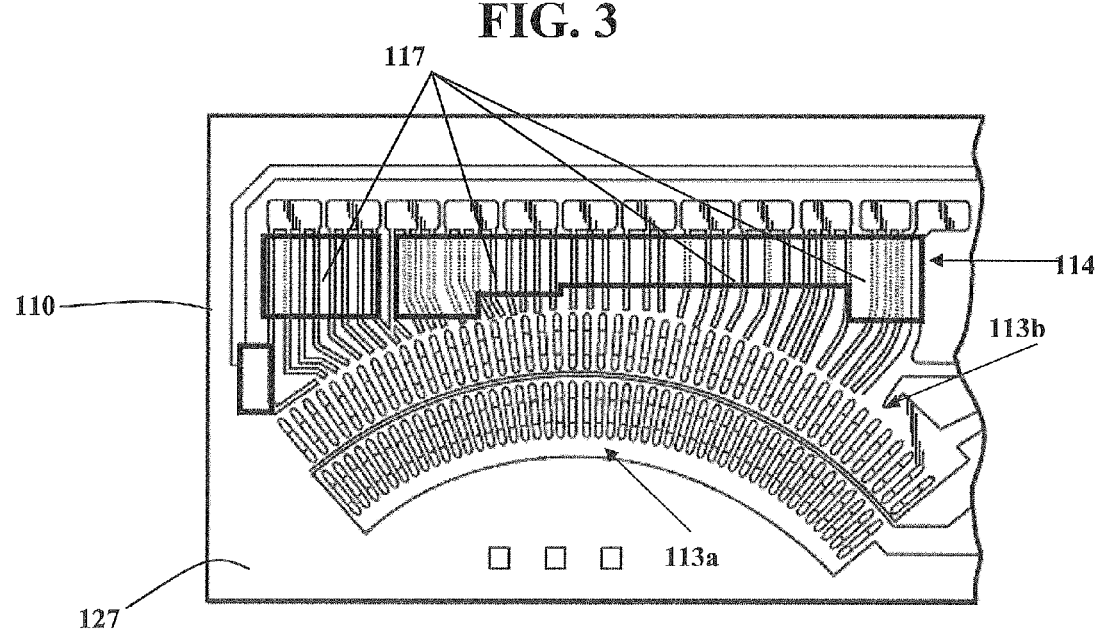
FIG. 4 is a partial plan view of a sender card in the sensor shown in FIG. 1.

As shown in FIG. 4, sender card 110 in sensor 104 can include a substrate 127 that can be patterned with conductive segments 113a, 113b and an electrically conductive resistive material 114. Substrate 127 can be made of any suitable material consistent with the described embodiments. One non-limiting example of substrate 127 is ceramic or the like. Conductive segments 113a, 113b can be made of any material that conducts current. Some non-limiting examples of conductive segments 113a, 113b are silver, platinum, palladium, copper or the like. Resistive material 114 can be any device that resists the flow of electricity. One non-limiting example of resistive material 114 is metal-oxide film, carbon film or the like. Resistive material 114 can be a variable resistor and include at least one electrically conductive resistive strip 117. If there are multiple strips 117, each strip can having a varying resistance value. Alternatively, one or more of the strips 117 can have the same value. Each electrically conductive segment 113b can have an area of contact with resistive material 114. As wiper 120 rotates over and makes an electrical connection between electrically conductive segments 113a and electrically conductive segments 113b, the resistance value changes. Other suitable configurations of sender card 110 are also available.

Mechanical sensor 112 can include a float 116 that moves with changes in the level of fluid in tank 105, and a float arm 118 coupled to float 116. Float 116 can be made of any material that follows the level of tank 105 due to the buoyant forces acting on the float. One non-limiting example of float 116 can be a block of foam or the like. The float arm 118 can be pivotally connected to sender card 110 and can include a wiper 120 that makes electrical contact with the resistive material 114 at a position determined by float 116. Other suitable configurations of mechanical sensor 112 are also available.

As float 116 moves in accordance with the fuel level, wiper 120 can follow a path on sender card 110, which can create a variable resistance value creating a different voltage reading at connection point 124. This voltage reading can be sent to, for example, a control module (not shown) that uses this voltage reading to display a corresponding fuel level on a fuel gauge of an instrument panel (not shown).

Accordingly, as shown in FIG. 3, when float is located at Position A, for example, the fuel tank can be empty or near empty and float 116 can be at the lowest position within tank 105. When float 116 is at the lowest position in tank 105, wiper 120 travels, for example, in a rotary motion across the tracks of sender card 110 to translate the position of float 116 into a resistance value that indicates that the level of fuel is empty or near empty. Similarly, when float is located at Position B, for example, the fuel tank can be full or near full and float 116 can be at the highest position within tank 105. When float 116 is at the highest position in tank 105, wiper 120 travels, for example, in a rotary motion across the tracks of sender card 110 to translate the position of float 116 into a resistance value that indicates that the level of fuel is full or near full.

Returning to FIGS. 2 and 4, power supply 108 can be coupled to a resistive material 114 through a resistor 122, conductive segments 113a, and as discussed in further detail below, through conductive segments 113b and a wiper 120. Resistive material 114 can be any suitable resistance element and can be a wire wound resistance element, a deposit of an electrically resistive medium, a ribbon of resistive material or the like. Further, resistive material 114 can be coupled to ground.

Figure 7:
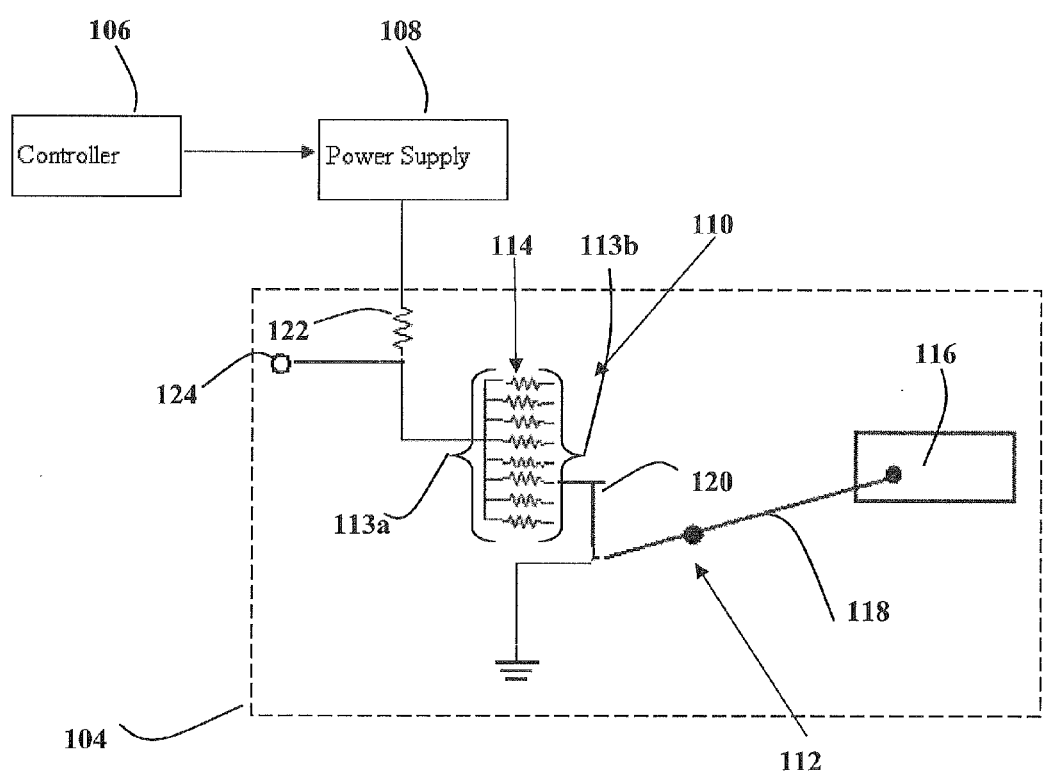
FIG. 7 is a block diagram of a controller, power supply and a sensor according to another embodiment of the present invention.

As discussed previously, each strip 117 of resistive material 114 can have one lead coupled to power supply 108 and another lead configured for electrical connection to wiper 120. In an alternative embodiment, as shown in FIG. 7, each strip 117 of resistive material 114 can have one lead coupled to ground and another lead configured for electrical connection to wiper 120.

Figure 5:
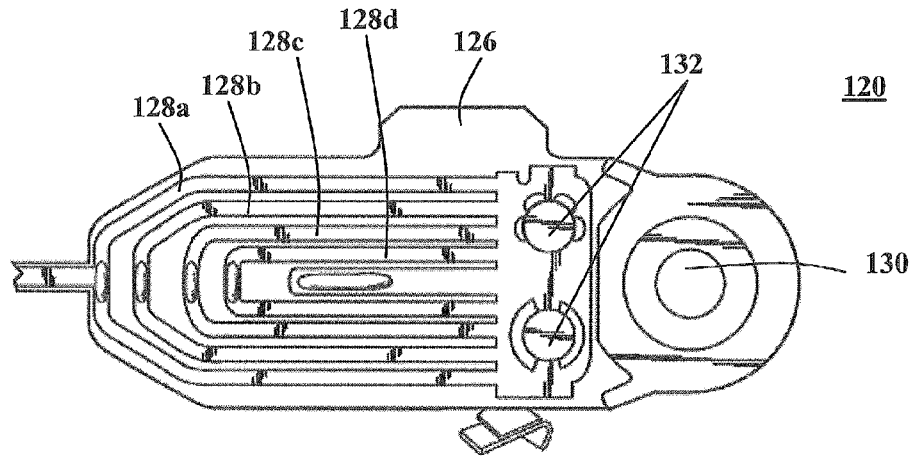
FIG. 5 is a partial plan view of a wiper in the sensor shown in FIG. 1.

As shown in FIG. 5, wiper 120 can include a carrier 126 for carrying wiper blades 128a, 128b, 128c, 128d. As the wiper 120 rotates across sender card 110, wiper blades 128a-d can make contact with electrically conductive segments 113a, 113b. Wiper blades 128a-d can be formed of one piece of any type of conductive metal. Some non-limiting examples of the conductive metal used in wiper blades 128a-d are silver, platinum, palladium, copper, gold, ruthenium or the like. Alternatively, wiper blades 128a-d can be formed from more than one piece of conductive metal. Wiper 120 can also include a bore 130 for securing wiper 120 to float arm 118. Further, wiper 120 can include attachments 132 for securing wiper blades 128a-d to carrier 126. Carrier 126 and attachments 132 can be integrally connected and can be made of plastic or any other suitable material. Other suitable configurations of wiper 120 are also available.

As discussed above, over time, contamination, such as sulfur contamination, can form on electrical components on sender card 110 because the sender card is frequently immersed in fuel. Embodiments of the present invention can remove at least a portion of the contamination accumulating on sender card 110. Contamination can be, for example, contamination that causes non-conductive areas or contamination that causes inaccurate voltage level readings from sender card 110. As discussed previously, other types of contamination are also possible.

Under normal operation, sensor 104 can sense the level of fluid in tank 105 and operate under an operating voltage from power supply 108. Power supply 108 can be any device that supplies voltage and/or current directly or indirectly to sensor 110. Although power supply 108 is depicted as one unit, power supply can include any suitable number of power supplies consistent with the described embodiments.

The operating voltage can be a steady-state voltage from the range of, for example, 0.5 volts to 6 volts. Power supply 108 can supply the steady-state operating voltage so that contact of wiper 120 with resistive material 114 closes the circuit, which permits current to flow from power supply 108 through resistive material 114. For example, power supply 108 can be a variable power supply and output voltage in a range of, for example, 0.5 volts to 6 volts to sender card 110 during normal operation. In other embodiments, power supply can output a current of, for example, 70 mA during sender card 110 during normal operation. Of course, power supply 108 can output other suitable voltage or current values during normal operation sufficient to operate sensor 104. During the normal operation, contamination can be accumulating on sender card 110 (i.e. a contamination accumulation phase).

To remove contamination on sender card 110, power supply 108 can supply a voltage at a surge level above the operating voltage to substantially remove at least a portion of the contamination on the sender card 110. During this contamination removal phase, the surge level can provide enough additional power to heat the resistive material 114 to an elevated temperature sufficient to remove at least a portion of the contamination accumulating on sender card 110. For example, power supply 108 can output voltage at a surge level in a range of, for example, 1 volt to 16 volts. In other embodiments, power supply can output a current of, for example, 200 mA to resistive material during contamination removal phase. In this manner, the temperature of resistive material 114 can rise by a predetermined amount of, for example, 20 degrees Centigrade. Of course, power supply 108 can output other suitable voltage or current values, such as an elevated current level two times the operation current, during the contamination removal phase sufficient to remove contamination on sender card 110. Further, the level of the surge voltage can depend on a variety of factors, including but not limited to, the type of fuel in the tank and the level of fuel in the tank.

Controller 106 can generate a control signal and send it to power supply 108 to indicate when to supply a voltage at a surge level above the operating level. Although controller 106 is depicted as one unit, controller 106 can include any suitable processor architecture and/or any suitable number of processors consistent with the described embodiments. Controller 106 may be a processor system with a processor and associated devices such as memory and communication controllers. It may be a single-chip controller, a micro-controller, or a logic circuit. If there is more than one processor in controller 106, the processors may include a networked architecture.

Figure 6:
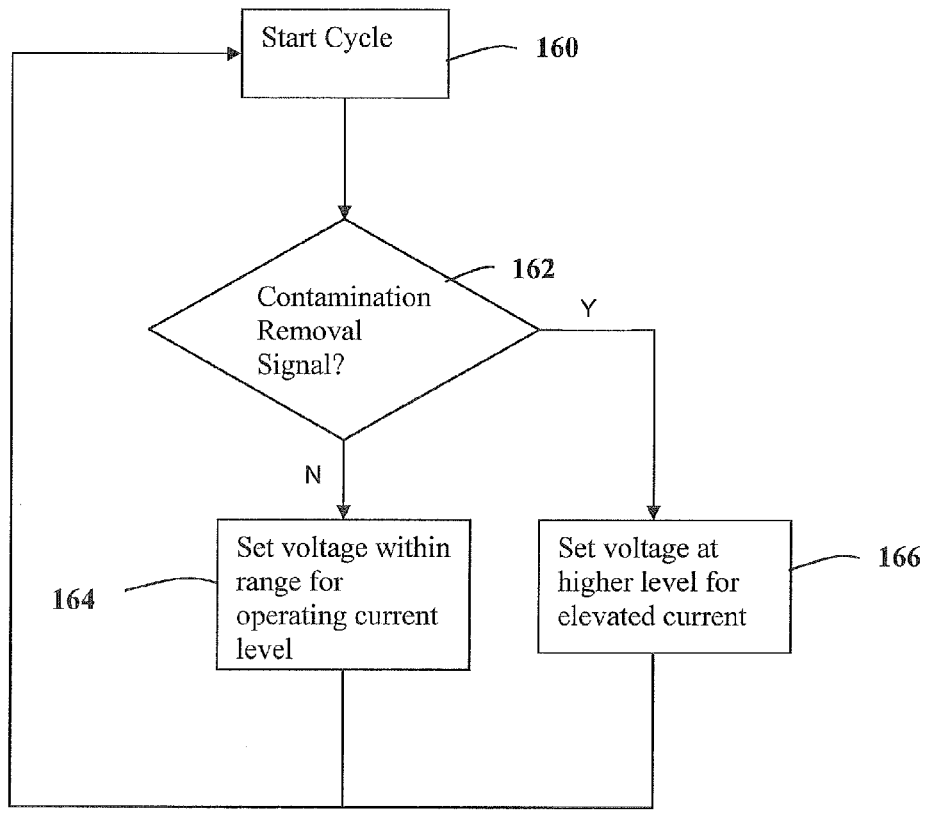
FIG. 6 is a flowchart diagram illustrating the operation of the sensor shown in FIG. 1.

As shown in FIG. 6, controller 106 will begin contamination removal phase detection at the start of a cycle at block 160. Once the cycle has started, controller 106 will move to decision block 162 to determine whether it should send a contamination removal signal. Controller 106 can establish whether a contamination removal signal should be sent to power supply 108 by, for example, determining whether the engine is in a starting mode, the engine is being ignited, the key is in the accessory position or the like. Alternatively, in another embodiment, controller 106 can also receive a signal from a contamination detection mechanism that detects contamination on sender card 110 and in turn, contamination detection mechanism can notify controller 106 when contamination has formed on electrical components located thereon. Once contamination detection mechanism notifies controller 106, a control removal signal can be sent to power supply 108. Further, in another embodiment, controller 106 can also send out a contamination removal signal periodically based on, for example time, independent of any other factor. Other suitable mechanisms for determining whether controller 106 should send a contamination removal signal are also available.

If controller 106 should not send a contamination removal signal, controller 106 moves to block 164 to send a control signal to power supply 108 to set the voltage level within the range for operating current. As discussed above, for example, the operating current level can be 70 mA. Controller 106 then returns to decision block 160 until the start of the next cycle.

If controller 106 should send a contamination removal signal, controller 106 moves to block 166 to send a control signal to power supply 108 to set the voltage at a higher level for elevated current. As discussed above, for example, the operating current level can be 200 mA. Controller 106 then returns to decision block 160 until the start of the next cycle.

Figure 8:
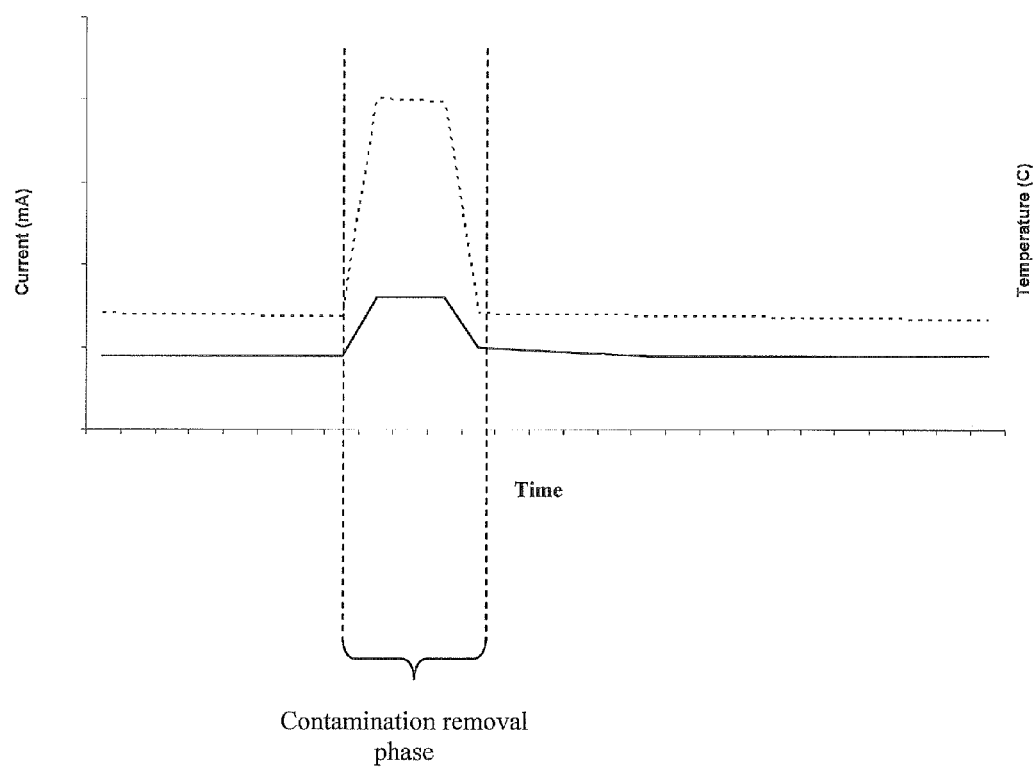
FIG. 8 is a graph of current flowing through a variable resistor in a sender card versus time and temperature of the sender card versus time.

FIG. 8 illustrates an exemplary graph of the current level (depicted as a solid line) flowing through resistive material 114 measured in mA. During normal operation, the current level can be relatively constant until controller 106 determines that a contamination removal signal should be sent to power supply 108. Once the contamination removal signal is sent, the current level increases to, for example, 200 mA for a predetermined amount of time and then falls to relatively the same level it was before the contamination removal signal was sent.

FIG. 8 also illustrates an exemplary graph of the temperature level (depicted as a broken line) of sender card 110. Similar to the current level, during normal operation, the temperature level can be relatively constant until controller 106 determines that a contamination removal signal should be sent to power supply 108. Once the contamination removal signal is sent, the temperature level increases for a predetermined amount of time to, for example, 80 degrees Centigrade and then falls to relatively the same level it was before the contamination removal signal was sent.

While the invention has been described in connection with what is presently considered to be the most practical and preferred embodiment, it is to he understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A sensor for measuring the level of contaminative substance in a tank, comprising:
   a float mechanism located inside the tank to move with changes in the level of the contaminative substance;
   a sender card having a variable resistor, at least a portion of the sender card in fluid communication with the contaminative substance;
   a wiper coupled to the float mechanism and making electrical contact with the variable resistor at a position determined by the position of the float mechanism; and
   a variable voltage supply coupled to one of the wiper and the sender card so that contact of the wiper with the variable resistor closes a circuit permitting current to flow from the variable voltage supply through the variable resistor;

wherein the variable voltage supply is configured to supply a steady-state operating voltage within a first range and periodic voltage at a surge level above the first range; the surge level being selected to provide enough additional power to heat the variable resistor to an elevated temperature sufficient to remove at least a portion of the contamination accumulating on the sender card.

2. The sensor of claim 1, wherein the tank is a vehicular fuel tank.

3. The sensor of claim 2, wherein the substance includes at least one of a fossil fuel, an alcohol, a biofuel, water, oxygen, hydrogen and natural gas.

4. The sensor of claim 3, wherein the elevated temperature is at least 80 degrees Centigrade.

5. The sensor of claim 3, wherein the first range of voltage is between about 0.5 volts and about 6 volts and the surge level is between about 1 volt and 16 volts.

6. The sensor of claim 3, wherein the tank is configured to supply fuel to an engine and the variable voltage supply is configured to supply the voltage at the surge level during ignition of the engine.

7. The sensor of claim 1, wherein the variable resistor includes at least one strip of electrically conductive resistive material.

8. The sensor of claim 1, wherein the variable resistor includes a plurality of conductive segments having different resistance, each of the plurality of segments having a first lead coupled to one of the variable voltage supply and ground and a second lead configured for electrical connection to the wiper.

* * * * *